US006947952B1

(12) United States Patent
Welch et al.

(10) Patent No.: US 6,947,952 B1
(45) Date of Patent: Sep. 20, 2005

(54) METHOD FOR GENERATING UNIQUE OBJECT INDENTIFIERS IN A DATA ABSTRACTION LAYER DISPOSED BETWEEN FIRST AND SECOND DBMS SOFTWARE IN RESPONSE TO PARENT THREAD PERFORMING CLIENT APPLICATION

(75) Inventors: Michael Dean Welch, Irvine, CA (US); Hirohisa Yamaguchi, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 555 days.

(21) Appl. No.: 09/569,242

(22) Filed: May 11, 2000

(51) Int. Cl.[7] .............................................. G06F 17/30
(52) U.S. Cl. ...................... 707/104.1; 707/8; 707/10; 709/203
(58) Field of Search ................... 707/1–10, 100–104.1, 707/200–206; 709/202–220, 100–108, 223–225; 711/150–156, 163–165; 703/22

(56) References Cited

U.S. PATENT DOCUMENTS

| | | | | |
|---|---|---|---|---|
| 5,408,657 A | * | 4/1995 | Bigelow et al. | 707/100 |
| 5,459,860 A | * | 10/1995 | Burnett et al. | 707/101 |
| 5,857,184 A | * | 1/1999 | Lynch | 707/1 |
| 5,893,912 A | * | 4/1999 | Freund et al. | 707/1 |
| 6,016,490 A | * | 1/2000 | Watanabe et al. | 707/10 |
| 6,026,428 A | * | 2/2000 | Hutchison et al. | 709/100 |
| 6,031,978 A | * | 2/2000 | Cotner et al. | 709/248 |
| 6,112,196 A | * | 8/2000 | Zimowski et al. | 707/10 |
| 6,125,382 A | * | 9/2000 | Brobst et al. | 709/102 |
| 6,134,627 A | * | 10/2000 | Bak | 709/100 |

(Continued)

FOREIGN PATENT DOCUMENTS

| | | | | | |
|---|---|---|---|---|---|
| EP | 1032175 | * | 8/2000 | | 29/5 |
| EP | 1091293 | * | 4/2001 | | 9/46 |

OTHER PUBLICATIONS

M.A.Kotabchi et al. comparative analysis of RDBMS and OODBMS: A case study, Compcon spring '90, "Intellectual leverage"Digest of papers, thirty-fifth IEEE conputer internal conference, Feb.-Mar. 1990, pp. 528-537.*

Hiroshi Ishikawa et al. "An object oriented database system Jasmine: Implementation, applicaton, and extension", IEEE transactions on knowledge and data engineering. vol. 8,No. 32, Apr. 1996, pp. 285-304.*

Primary Examiner—Srirama T Channavajjala
(74) Attorney, Agent, or Firm—Mark T. Starr; Michael B. Atlass; Lise A. Rode

(57) ABSTRACT

A method in a computer system executing a client application and an OODBMS and an RDBMS software, which system has a storage medium accessible by the RDBMS software and the OODBMS software being accessible by the client application. The method generates unique object identifiers in a data abstraction layer disposed between the OODBMS and the RDBMS software in response to a parent thread created by the client application. The method includes the steps of creating a child thread that has access to the RDBMS software, which child thread is used exclusively for generating object identifier numbers and for returning the same to the parent thread. A unique object identifier table is created, which is maintained by the child thread. In response to a request by the parent thread for a unique object identifier, the child thread generates a finite number of the unique object identifiers and communicates their values to the parent thread. After this, a recording is made in the table of the fact that a finite number of unique object identifiers have been generated.

17 Claims, 12 Drawing Sheets

U.S. PATENT DOCUMENTS

| | | | |
|---|---|---|---|
| 6,192,371 B1 * | 2/2001 | Schultz | 707/103 R |
| 6,301,601 B1 * | 10/2001 | Helland et al. | 707/104.1 |
| 6,339,771 B1 * | 1/2002 | Zimowski et al. | 707/10 |
| 6,343,371 B1 * | 1/2002 | Flanagan et al. | 700/17 |
| 6,374,252 B1 * | 4/2002 | Althoff et al. | 707/102 |
| 6,664,978 B1 * | 12/2003 | Kekic et al. | 715/733 |

* cited by examiner

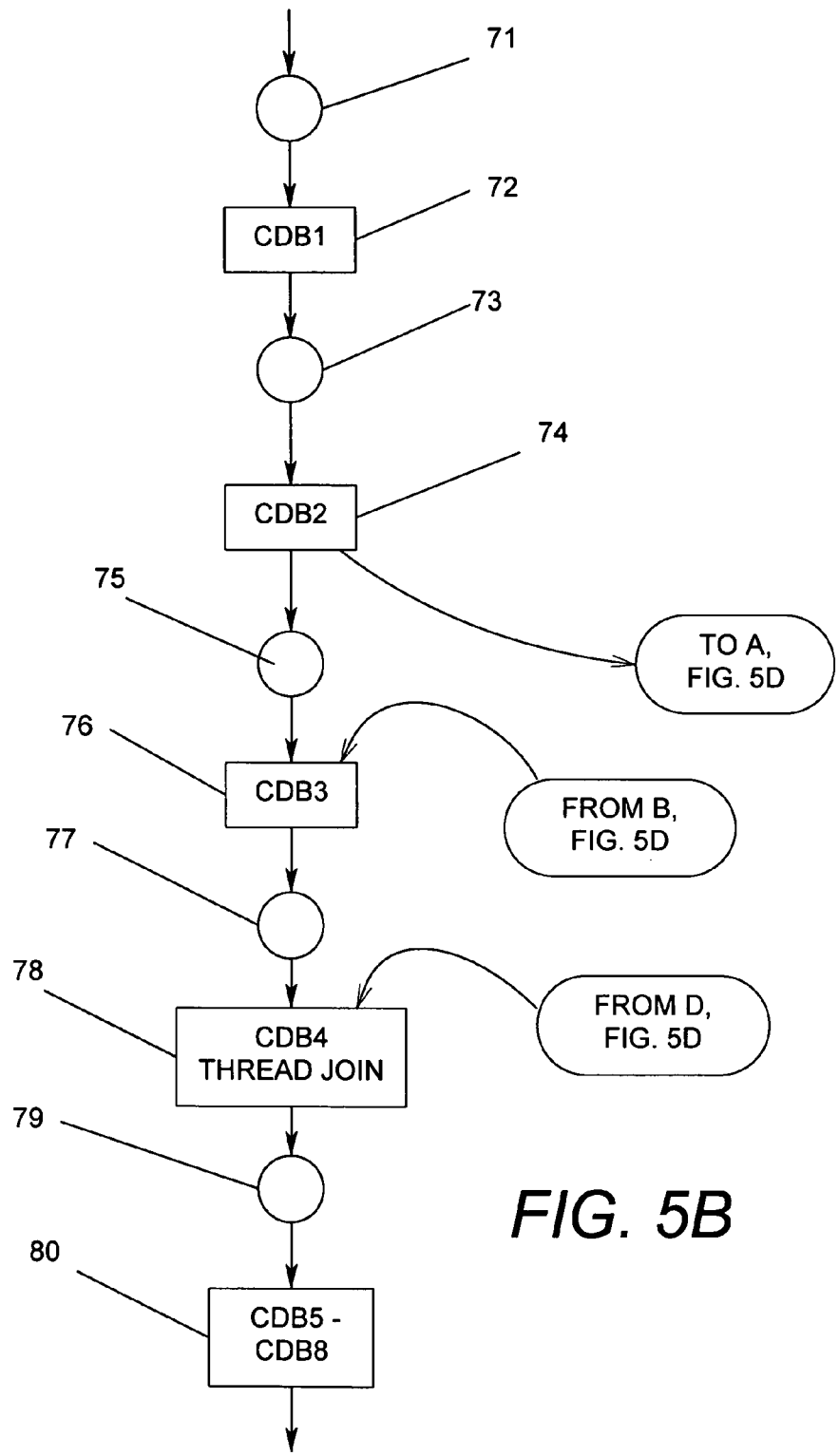

METHOD FOR GENERATING UNIQUE OBJECT INDENTIFIERS IN A DATA ABSTRACTION LAYER DISPOSED BETWEEN FIRST AND SECOND DBMS SOFTWARE IN RESPONSE TO PARENT THREAD PERFORMING CLIENT APPLICATION

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to object-oriented programming techniques and in particular to a new and improved method for generating unique object identifiers in a data abstraction layer, which provides an interface between an object-oriented database and a relational database. The new method expedites object instantiation on a data abstraction layer.

BACKGROUND OF THE INVENTION

A data abstraction layer ("DAL") effects communication between two disparate software modules. In the environment of the present invention, a DAL provides an interface between the application programming interface ("API") of an object-oriented database management system (or "OODBMS"), such as OSMOS, which is available from the assignee hereof and a relational database management system (or "RDBMS").

Each time a client application instantiates an object in the object-oriented database, a new OID (Object Identifier) must be assigned to the object. An OID is a unique number pair used to identify a particular object. The number pair comprises the class number of the object and an object number. The smallest unassigned object number for each class is stored within a table (OIDGEN) in the relational database. When a request to generate an OID comes in, the smallest unassigned object number for a particular class within the OIDGEN table is incremented by a constant value. This constant value and the new high value are returned to the request task, which then gains rights to all OID's between the previous smallest OID and the new smallest unassigned OID. This insures that every instantiated object is uniquely identified.

As the smallest unassigned object number for a class is incremented, the OIDGEN table entry for that class is locked. While the OIDGEN table entry is locked, any subsequent requests for generating an OID of this class are not permitted. Instead, subsequent requests are queued until the user application commits its current transaction. Since the request to generate an OID is tied with the rest of the user application's transaction, the OIDGEN table entry is not released until the application completes its transaction. Although generating an OID itself does not take long, a request to generate an OID cannot complete until all previous instantiations of the same class are complete, which does take a long time.

SUMMARY OF THE INVENTION

The method of the present invention breaks apart an object instantiation request into two distinct transactions. A separate thread is "fired off" from the original thread, or the original instantiation request. The separate thread simply requests generation of an OID.

By breaking the transaction into two threads, the time spent in locking an OIDGEN table entry is greatly reduced. A request for generating an OID no longer has to wait for all previous user application initiated transactions that contain object instantiations of the same class to complete. The OIDGEN table is locked only for the duration of OID generation. The shortened locking time greatly reduces wait time.

An object of the present invention is to provide an improvement in the performance of object instantiation on Data Abstraction Layers.

An advantage of the method of the present invention is that by reducing contention for rows in the table that tracks unassigned OID values, a substantial improvement in aggregate performance of concurrent object creation by multiple clients results.

These and other objects, which will become apparent as the invention is described in detail below, are provided by a method in a computer system executing a client application and an OODBMS and an RDBMS software, which system has a storage medium accessible by the RDBMS software and the OODBMS software being accessible by the client application. The method generates unique object identifiers in a data abstraction layer disposed between the OODBMS and the RDBMS software in response to a parent thread performing the client application. The method includes the steps of creating a child thread that has access to the RDBMS software, which child thread is used exclusively for generating object identifier numbers and for returning the same to the parent thread. A unique object identifier table is created, which is maintained by the child thread. In response to a request by the parent thread for a unique object identifier, the child thread generates a finite number of the unique object identifiers and communicates their values to the parent thread. After this, a recording is made in the table of the fact that a finite number of unique object identifiers have been generated.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 5A through 5D are a set of Petri diagrams illustrating operation of the method of the present invention.

DETAILED DESCRIPTION OF ONE EMBODIMENT

Figure 1:
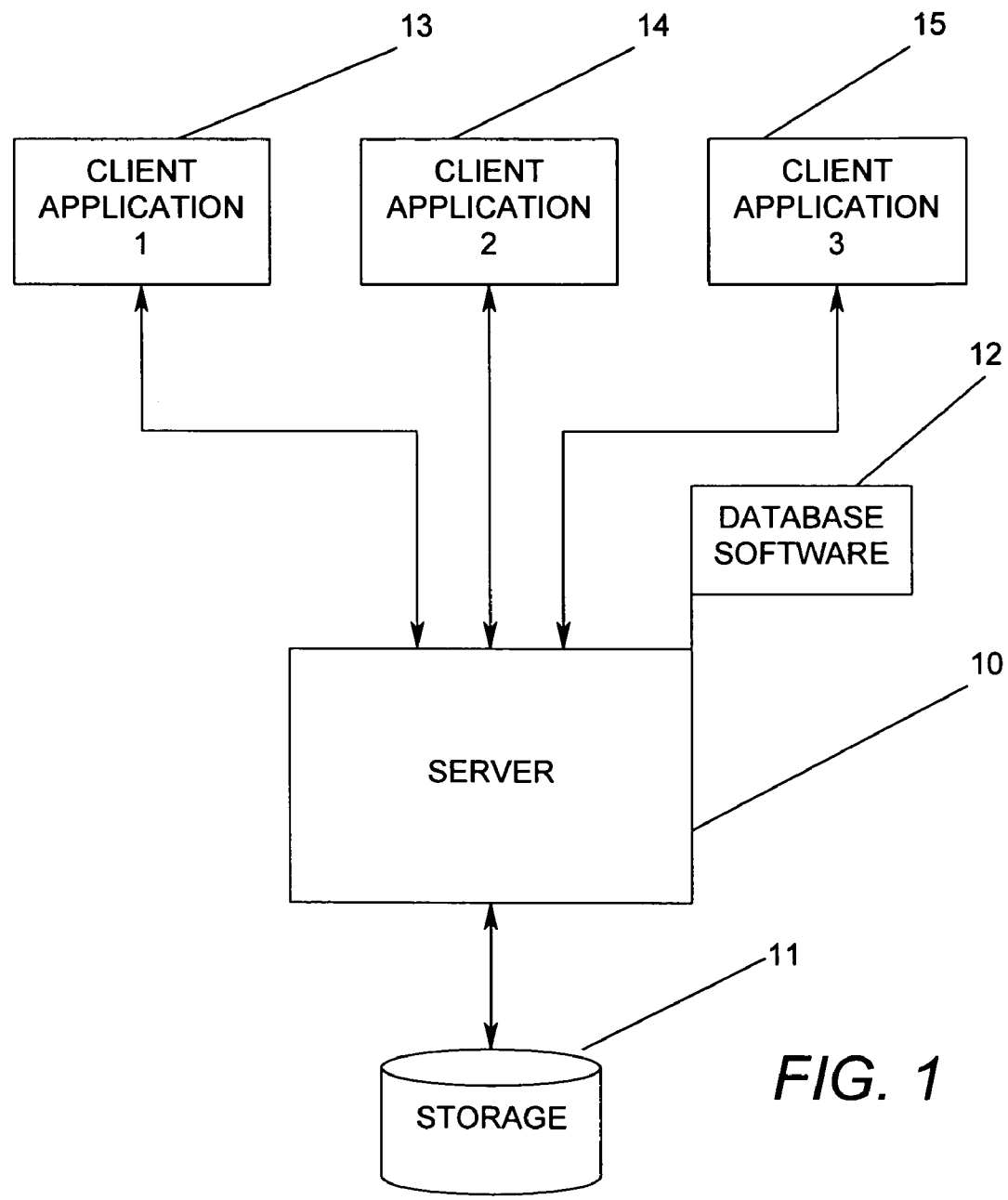
FIG. 1 is a block diagram of a system in which the method of the present invention may be used.

Before proceeding with a detailed description of the method of the present invention a background discussion of object-oriented terminology and repositories would be helpful. This discussion will focus on the terminology used herein. Background information that may be helpful in understanding the present invention may be had by reference to an issued U.S. Pat. No. 5,408,657 entitled METHOD OF IMPOSING MULTI-OBJECT CONSTRAINTS ON DATA FILES IN A DATA PROCESSING SYSTEM by Richard Bigelow and John Thompson, and assigned to the same assignee hereof.

Object Terminology

A normal object program stores objects in the computer system's memory. When the program terminates, the memory used by those objects is freed and reused by other programs, making the objects that the program stored transient. An object database stores objects on a computer disk. Since the information on a computer disk remains in existence, even when the computer is turned off, an object database provides the ability to persistently store objects. An object program that uses an object database thus has the option of storing objects transiently or persistently.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. But, if the customer opened multiple accounts, the customer's name and address would appear in multiple account objects. Therefore, it is desirable to define a separate customer object and place the name and address as attributes of the customer object. The customer account object would then contain a reference to the customer object.

A class is a set of objects with similar attributes and behavior. Every managed object instance has a class association with it. An object is an instance of its class. Stated otherwise, a class is a template of objects of similar nature. A superclass is a managed class from whose specification another class (i.e., its subclass) is derived. Inheritance is the conceptual mechanism by which features are acquired by a subclass from its superclass.

The present invention is described herein as a part of an Object-Oriented/Relational Database Management System, referred to as OSMOS, which is available from Unisys Corporation, assignee hereof. However, it is pointed out that the present invention is useful in any database management system where it is necessary to employ object identifiers.

Referring now to the drawings and FIG. 1 in particular, a block diagram is shown of a system in which the method of the present invention may be used. A server 10 is shown coupled to a storage device 11. The server may comprise any readily available computer on the market today, such as for example the Unisys ES3000, ES5000 or ES7000. The server 10 is shown executing database software 12, and at least three separate client applications 13, 14 and 15. In one example to be amplified hereinbelow, each of the three client applications 13, 14 and 15 are attempting to access data through the database software 12, wherein such data is persistently stored in the storage device 11. A problem can occur when all three client applications are attempting to access data at the same time.

Figure 2:
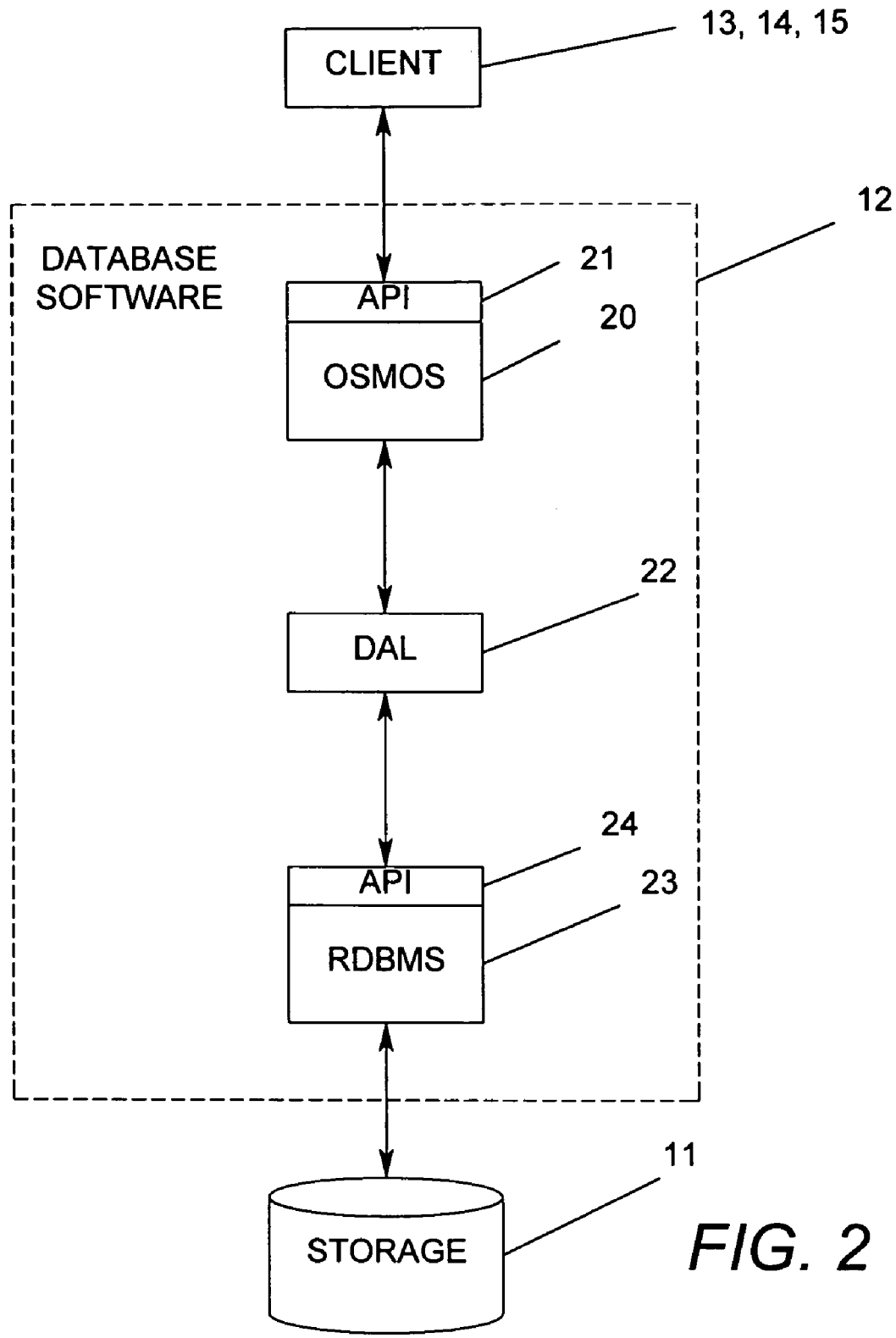
FIG. 2 is a block diagram of the software components of the present invention.

Referring now to FIG. 2, a hardware/software block diagram further illustrates details of the database software 12. Client applications 13, 14, and 15 access an object-oriented database that is managed by an Object Oriented Database Management System 20 ("OODBMS"), such as the OSMOS Object Oriented Database Management System available from the assignee hereof, by means of an API 21. One embodiment of the present invention, in the form of a Data Abstraction Layer ("DAL") 22, which implements the functionality of the OODBMS 20 using the functionality provided by a Relational Database Management System ("RDBMS") 23 by means of another API 24. Since it is necessary to have an object identifier ("OID") for every object stored in an OODB, the DAL 22 is employed for generating unique OID's within the scope of the database. The RDBMS 23 has direct access to the storage device 11. It is the function of the DAL 22 to provide an interface between the OODBMS database 20 and the relational database 23. One function of the DAL 22 is a computer-implemented method for generating unique object identifiers, which will be explained in greater detail hereinbelow.

Figure 3:
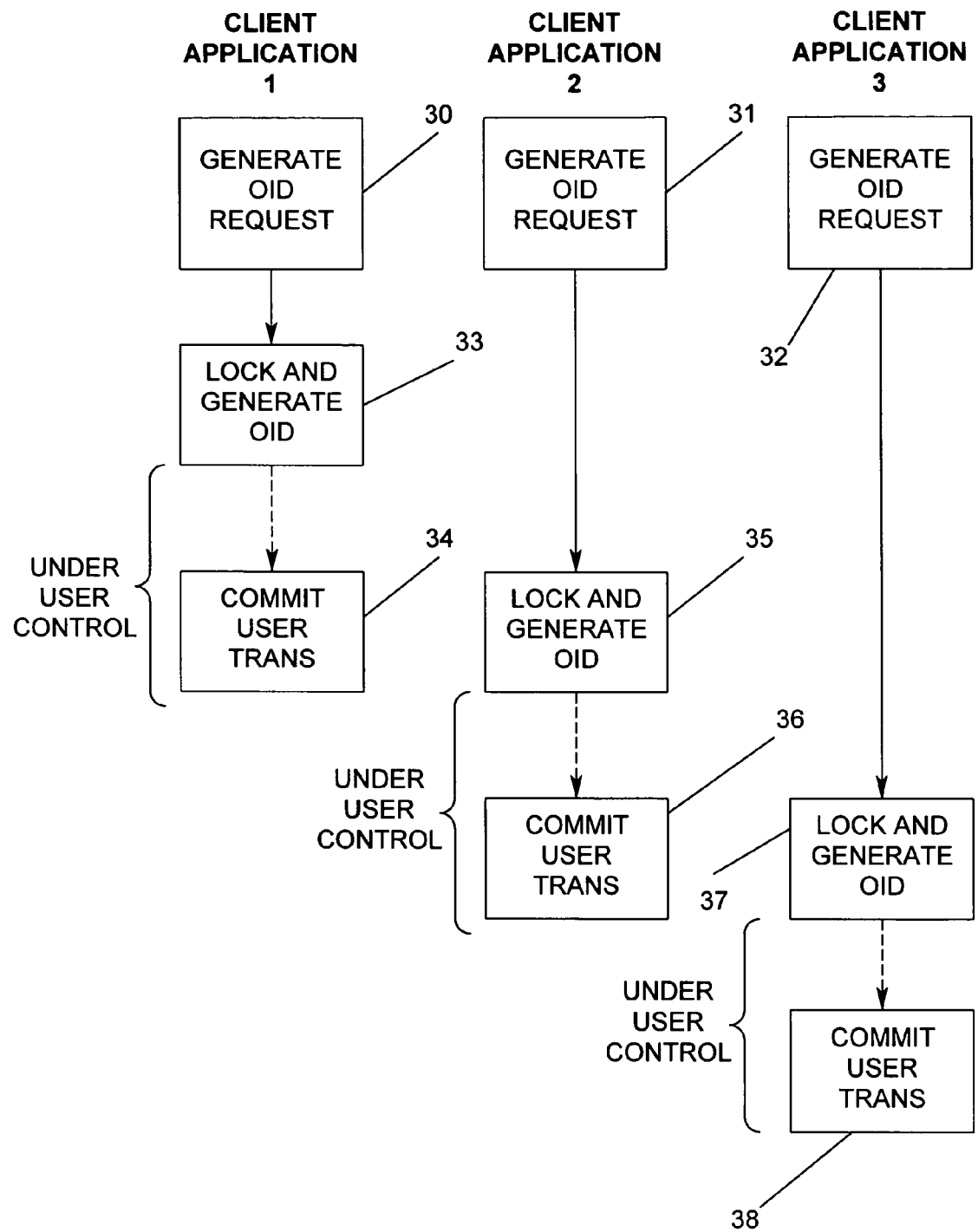
FIG. 3 is a diagram illustrating a problem with the prior, which is addressed by the method of the present invention.

Referring now to FIG. 3, a diagram illustrating a problem with the prior is shown, which problem is addressed by the method of the present invention. Each of the three client applications 13, 14 and 15 are making a request 30, 31 and 32, respectively, for an object identifier (OID) at substantially the same time. According to the prior art, the first to take over is the first to get an OID, as shown by the left-most thread emanating from the request 30. The OIDGEN table entry is locked from the point in time at which an OID is generated (block 33) until a later point in time when the user application commits the user transaction (block 34). The user application may perform an indeterminate amount of work between these two points in time, which are under user control. Once the first thread issues a commit, the second thread emanating from the request 31 now locks the OID-GEN table entry and generates an OID (block 35). At this time the second thread is free to perform an indeterminate amount of work followed by a commit to the user transaction (block 36). Also, the third thread emanating from the request 32 performs a lock and generate OID (block 37) may perform an indeterminate amount of work, followed by a commit to the user transaction (block 38). The time between each of theses actions can be enormous in comparison to processor time.

Figure 4:
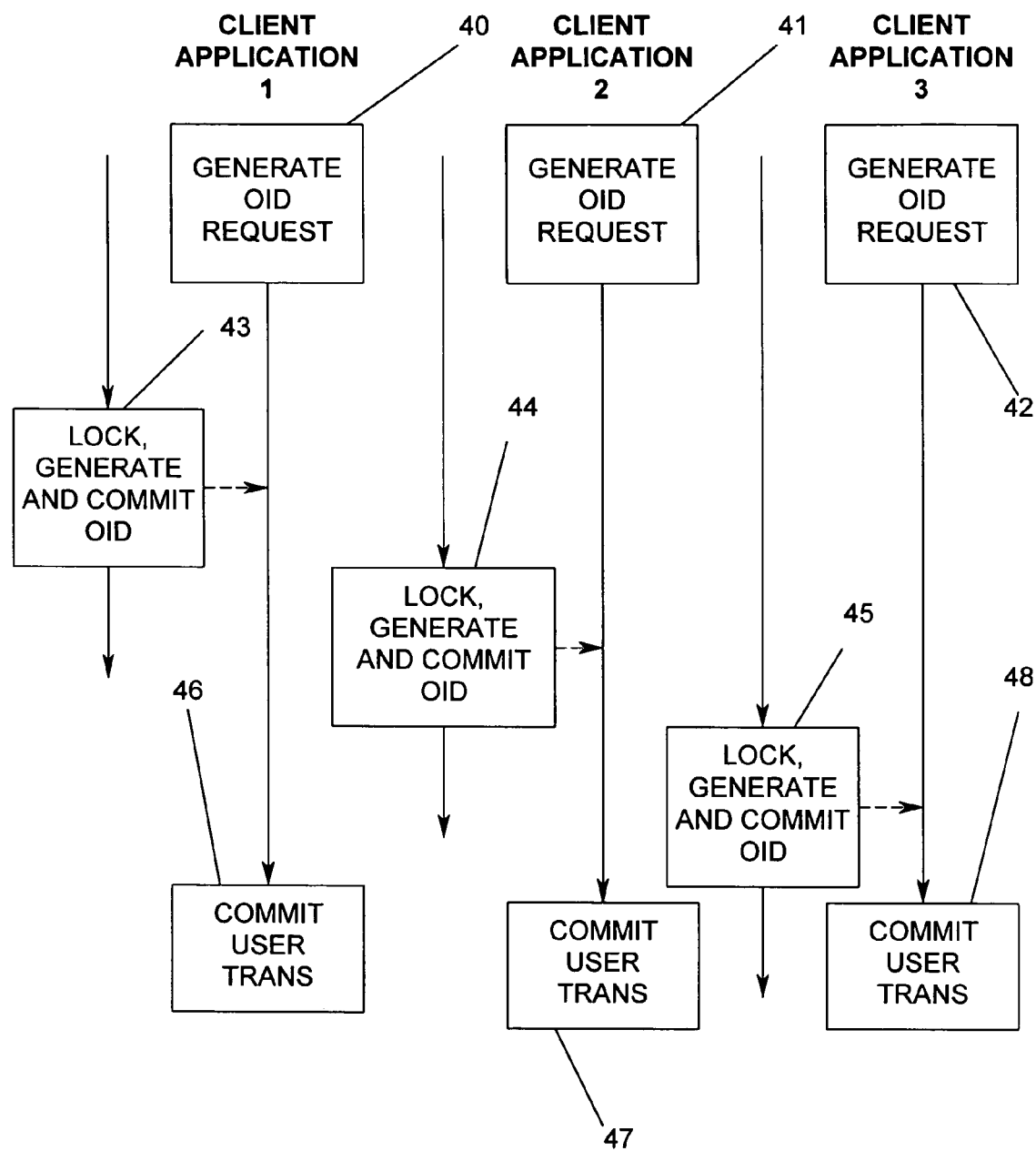
FIG. 4 is a diagram illustrating the same problem as shown in FIG. 3 when addressed by the method of the present invention.

Referring now to FIG. 4, a diagram illustrating the same problem as shown in FIG. 3 is shown when addressed by the method of the present invention. The same three client applications 13, 14 and 15 are again making requests for object identifiers (OID's) as represented by blocks 40, 41 and 42. However, in this example there are three separate lock, generate and commit OID operations (blocks 43, 44 and 45) performed independently of the transactions of their respective parent's threads, which are hereinafter sometimes referred to as "child" threads. The original threads are sometimes referred to hereinafter as "parent" threads. As a result of employing the separate or child threads for generation of the OID's commit user transactions (blocks 46, 47 and 48) can now occur almost simultaneously. Because the lock and generate OID operations (blocks 43, 44 and 45) are relatively quick, and are separate from the user application controlled transactions, they occur within a few milliseconds of one another in comparison to several seconds as in the prior art technique.

Referring now to FIGS. 5A through 5D a set of four Petri net diagrams illustrate the operation of the method of the present invention. Before describing these diagrams in detail, a description of a Petri net or diagram may be useful to the reader. A Petri net is represented as a bipartite directed graph. The two types of nodes in a Petri net are called places and transitions. Places are marked by tokens; a Petri net is characterized by an initial marking of places and a firing rule. A firing rule has two aspects: a transition is enabled if every input place has at least one token. An enable transition can fire; when a transition fires, each input place of that transition loses one token, and each output place of that transition gains one token. In modeling, the firing of a transition simulates the occurrence of that event. Of course, an event can take place only if all of the conditions for its execution have been met; that is, the transition can be fired only if it is enabled. For more information on Petri nets, reference is made to a textbook entitled "Software Engineering Concepts", by Richard E. Fairley, published by McGraw-Hill Book Company of New York. Also, Petri nets are described in another textbook entitled "Discrete Mathematics" by Richard Hohnsonbaugh, published by Macmillan Publishing Company of New York.

As alluded to hereinabove, every object stored in an object-oriented database must have an object identifier (OID) that is unique within the scope of the database. Collectively, the operations depicted in FIGS. 5A through 5D, FIG. 6, FIG. 7 and FIGS. 8A and 8B describe a method for efficiently generating such object identifiers. They make use of multi-threading, a thread local storage facility (TLS), thread synchronization primitives as well as a special table (OIDGEN) within the relational database. Analogous functionality could be implemented using multi-processing, shared-memory, process synchronization primitives and the OIDGEN table within the relational database.

Figure 5A:
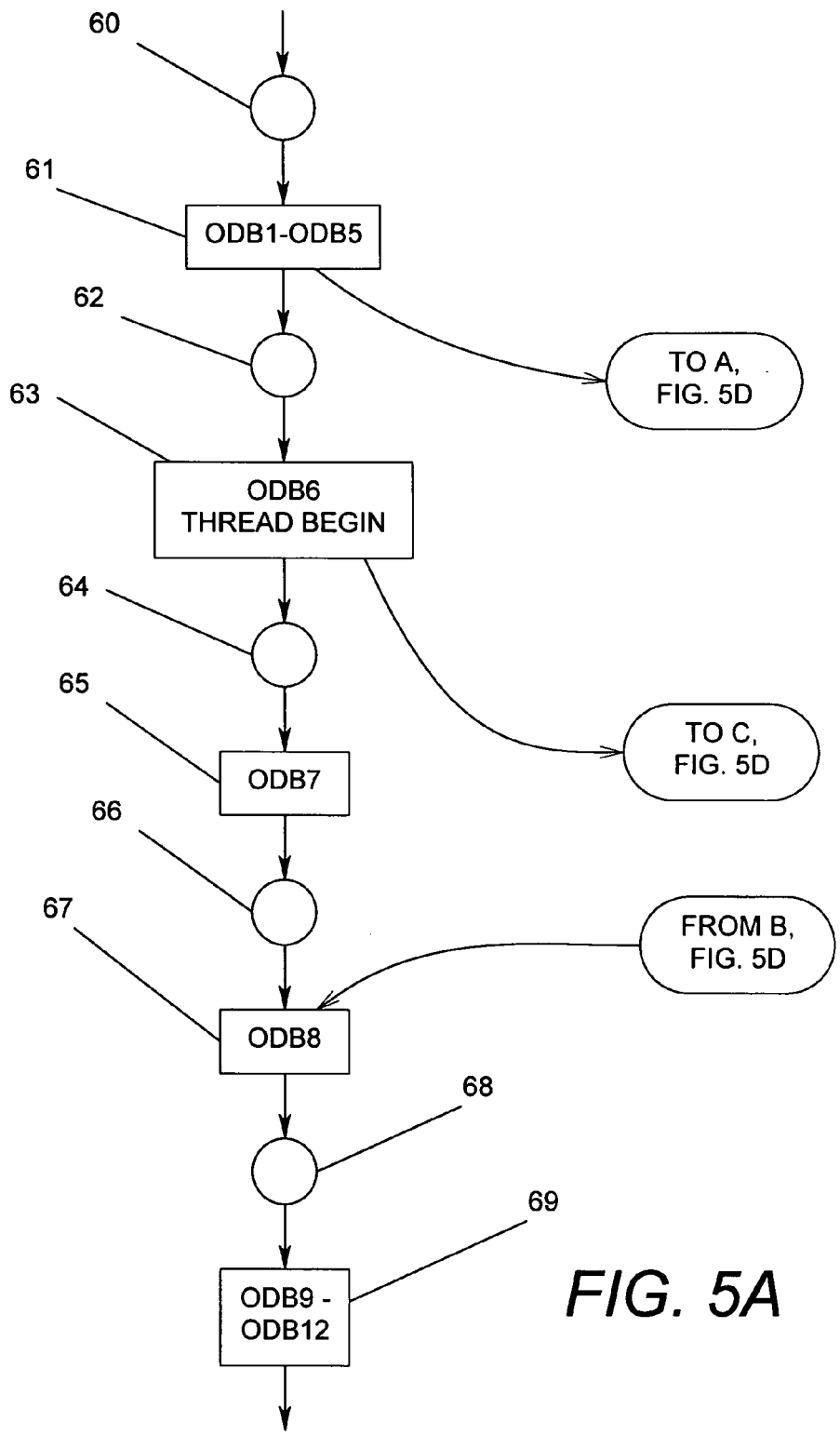

FIG. 5A illustrates the Open Database operation of the process, which begins from a user application requesting "Open Database". In particular, this operation requests opening an OODB of the OODBMS 20 using the API 21, which causes a connection to be made to a relational database of the RDBMS 23. This operation also spawns a child thread of execution that is not directly visible to the user. This child thread is used exclusively for Object Identifier (or "OID") creation. Beginning with a place 60, a first transition 61 includes sequential performance of steps ODB1 through ODB5, as follows:

ODB1. Create a childEvent object for synchronizing the execution of the child thread. Store a pointer to this object in the Thread Local Storage (TLS) container (pointed to by oidGenCont);

ODB2. Create a parentEvent object for synchronizing the execution of the parent thread. Store a pointer to this object in the TLS container;

ODB3. Set the "operation" member of the TLS container to its "initialize" state;

ODB4. Set the TLS member variables used to pass "parameter values" corresponding to the "initialize" state (e.g. server name, database name, user name, user's password);

(In literature, this process is commonly referred to as marshalling the parameters.) and, ODB5. Signal the childEvent object to indicate that the child thread has work to do and should resume execution if it is currently waiting on its childEvent event.

A result of signaling the childEvent in step ODB5 above (transition 61, FIG. 5A) is that the Control Worker portion of the process (FIG. 5D) may be allowed to resume execution. The edge leading from the transition 61 to the Control Worker portion of the process (FIG. 5D) is denoted by a connector A, and will be amplified further hereinafter in conjunction with the description of FIG. 5D. Following the transition 61, a place 62 indicates another transition 63, which includes the following step:

ODB6. Execute the thread package's operation to initiate the Control Worker routine in a separate "child" thread, which passes a pointer to the oidGenCont container that is stored in Thread Local Storage ("TLS"). From this point forward, the current thread will be referred to as the "parent" thread. The thread initiated in this step is referred to as the "child" thread.

After this, a place 64 indicates another transition 65, which saves the child's thread id in the TLS container ODB7). Next, a place 66 indicates another transition 67 to wait on the parentEvent ODB8. The wait is for the child thread to signal that it has attempted to initialize properly and establish its own connection with the database. Note that the transition 67 must wait for both the place 66 and a place 110 in the Control Worker (FIG. 5D) as denoted by a connector B.

Next, a place 68 indicates yet another transition 69, which performs steps ODB9 through ODB12 as follows:

ODB9. Un-marshal the "initialize" operation's result value from the TLS container indicating the child thread's success or failure to initialize and establish its own connection to the database.

ODB10. If the child returned a failure indication, the parent will also return a failure indication.

ODB11. The parent thread establishes its connection to the database, which forms the primary communication mechanism to the database through which access of user data is routed.

ODB12. If either the child or the parent was unable to establish a connection with the database an error indication is returned, otherwise a success indication is returned.

Referring now to FIG. 5B, a Petri net diagram of the Close Database operation of the process is shown. While implementing a user application's request to close an Object Oriented Database (using the OODBMS application programming interface), this operation requests closure of the parent thread's connection to the relational database. It also requests that the child thread close its connection to the relational database. Lastly, it waits for the client thread to terminate. Beginning with a request from the user application through the OODBMS 20 and its API 21, a place 71 controls execution of a transition 72, which sets the "operation" member of the TLS container (pointed to by oidGenCont) to its "terminate" value.

After this, a place 73 controls execution of a transition 74, which signals the childEvent Object that is pointed to by a member variable of the TLS container. This action indicates that the child thread has work to do and should resume execution if the child tread is currently waiting on its childEvent event. At this juncture of the process, a signal is made to the Control Worker portion of the process, as denoted by a connector A, which will be amplified further hereinafter in conjunction with the description of FIG. 5D. Following execution of the transition 74, a place 75 controls execution of transition 76, which imposes a wait on the parentEvent. The wait is for the child thread to signal that it has attempted to close its connection with the database. Note that the transition 76 must wait for both the place 75 and the place 110 in the Control Worker (FIG. 5D) as denoted by a connector B.

Following the above, a place 77 controls execution of a transition 78 for joining of the threads by executing the thread package's operation to join the child thread to the currently executing parent thread. Next, a place 79 controls execution of a transition 80, which performs the following steps:

CDB5. Close the parent thread's connection to the database;

CDB6. Delete the childEvent and parentEvent objects;

7CDB. Un-marshal the return value from the child's "terminate" operation; and,

CDB8. If either the child or the parent was unable to close their respective connection to the database return an error indication, otherwise return a success indication.

Figure 5C:
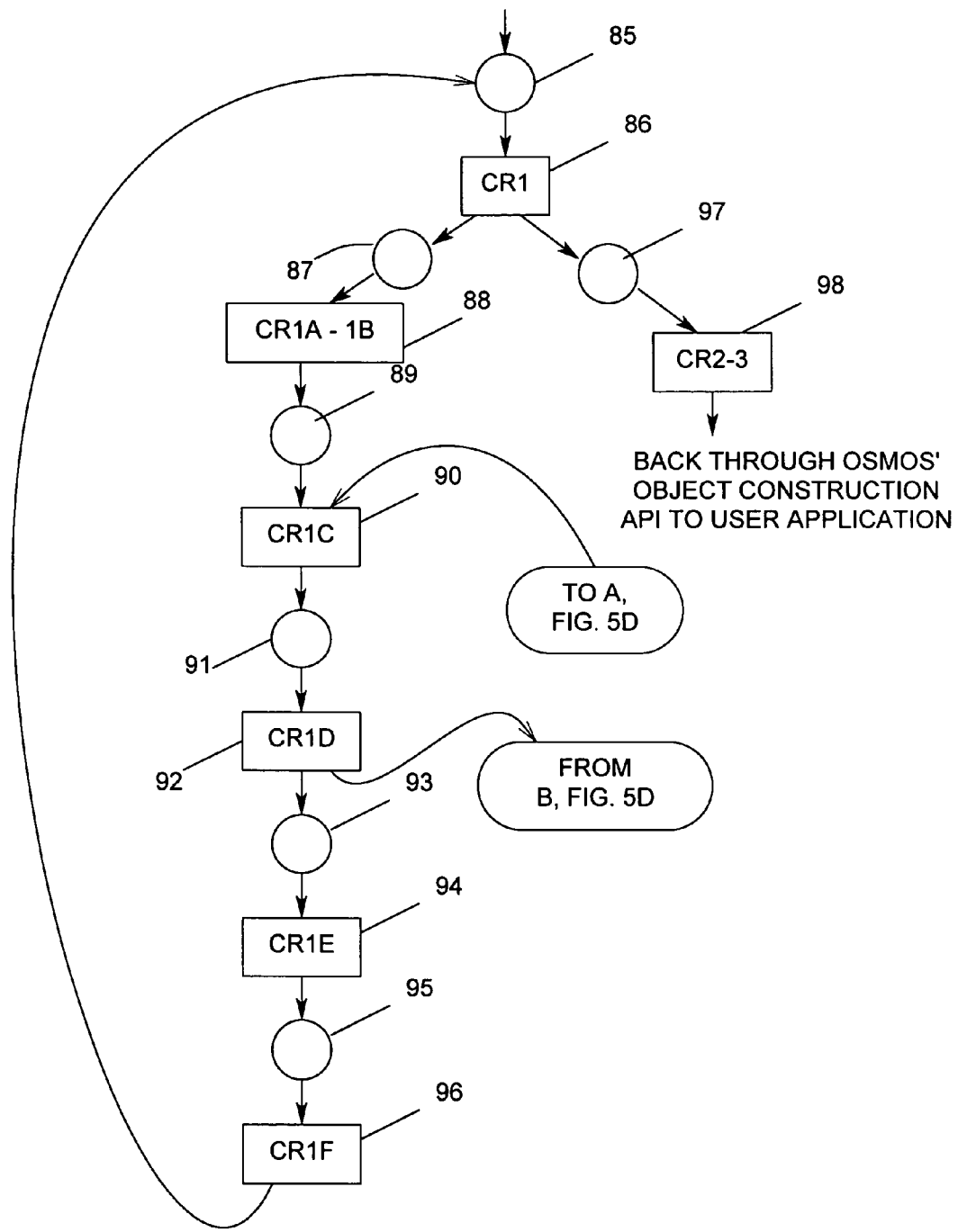

Referring now to FIG. 5C, the Create Record operation of the process is illustrated. While implementing a user application's request to create a new object in the object-oriented database of the OODBMS 20 (using the API 22), it is necessary to generate an object identifier whose value is unique within the scope of the entire database. The purpose of this operation is to generate unique object identifiers.

In the Data Abstraction Layer 22 of the OODBMS 20, Object Identifiers comprise two concatenated values. The first identifies the class of the object (classId) and the second is a unique value within the class (nextRow). To facilitate computing these unique values, an extra table (OIDGEN) is added to the relational database. This table has a row for each class of the object database that is represented in the relational database. Each row contains the next available unique value for the class.

The parent thread maintains a table of structures (gen). There is one entry in this table for each class in any object-oriented database that is accessed by using the OODBMS 20. The structures contain two fields. The first is the next row number that is available to the thread (gen[classId]->next) and the second is the number of rows that the parent thread has rights to use (gen[classId]->numberAvailable). Beginning with the user application invoking the object construction API 21 of the OODBMS 20, a place 85 controls execution of a transition 86, as follows: when the number of available row numbers for a given class allocated to the parent is equal to zero, the following steps are performed:

CR1A. Set the "operation" member of the TLS container (pointed to by oidGenCont) to its "generateoid" value (transition 88).

CR1B. Marshal the "generateoid" parameters (i.e. classId. gen) (transition 88).

CR1C. After this, a place 89 controls execution of a transition 90, which signals the childEvent object that is pointed to by a member variable of the TLS container. This action indicates that the child thread has work to do and should resume execution if it is currently waiting on its childEvent event (transition 90).

CR1D. Following execution of a transition 90, a place 91 controls execution of a transition 92, which imposes a wait on the parentEvent object. This wait is for the child thread to signal that it has attempted to allocate a new batch of object identifiers to the parent thread. Note that the transition 92 must wait for both the place 91 and the place 110 in the Control Worker diagram (FIG. 5D) as denoted by a connector B.

CR1E. Un-marshal the return values from the "generateOid" operation (classId, gen) (transition 94).

CR1F. If the "generateoid" operation executed by the child thread was unable to allocate a new batch of object identifiers, the parent thread should return an error (transition 96). Upon successful return of the "generateOid" operation, the gen[classId] structure has been updated such that its numberAvailable field has been set to a constant value (DALROWSALLOCATED) and its next field has been set to the nextRow value retrieved from the OIDGEN table (transition 96). Having successfully allocated a new batch of object numbers in the transition 96, the process returns to the place 85.

Following the above and returning back to the place 85, execution of the transition 86 proceeds as follows. When the number of available row numbers for a given class allocated to the parent is greater than zero a place 97 controls execution of a transition 98, which executes the following steps:

CR2. The parent thread updates its gen[classId] structure to reflect that it has consumed one of its allocated Object number values. That is, gen[classId]->next is incremented by one and gen[classId]->numberAvailable is decremented by one.

CR3. Finally, the new Object Identifier is composed in the parent thread by concatenating the classId with gen[classId]->next.

Figure 5D:
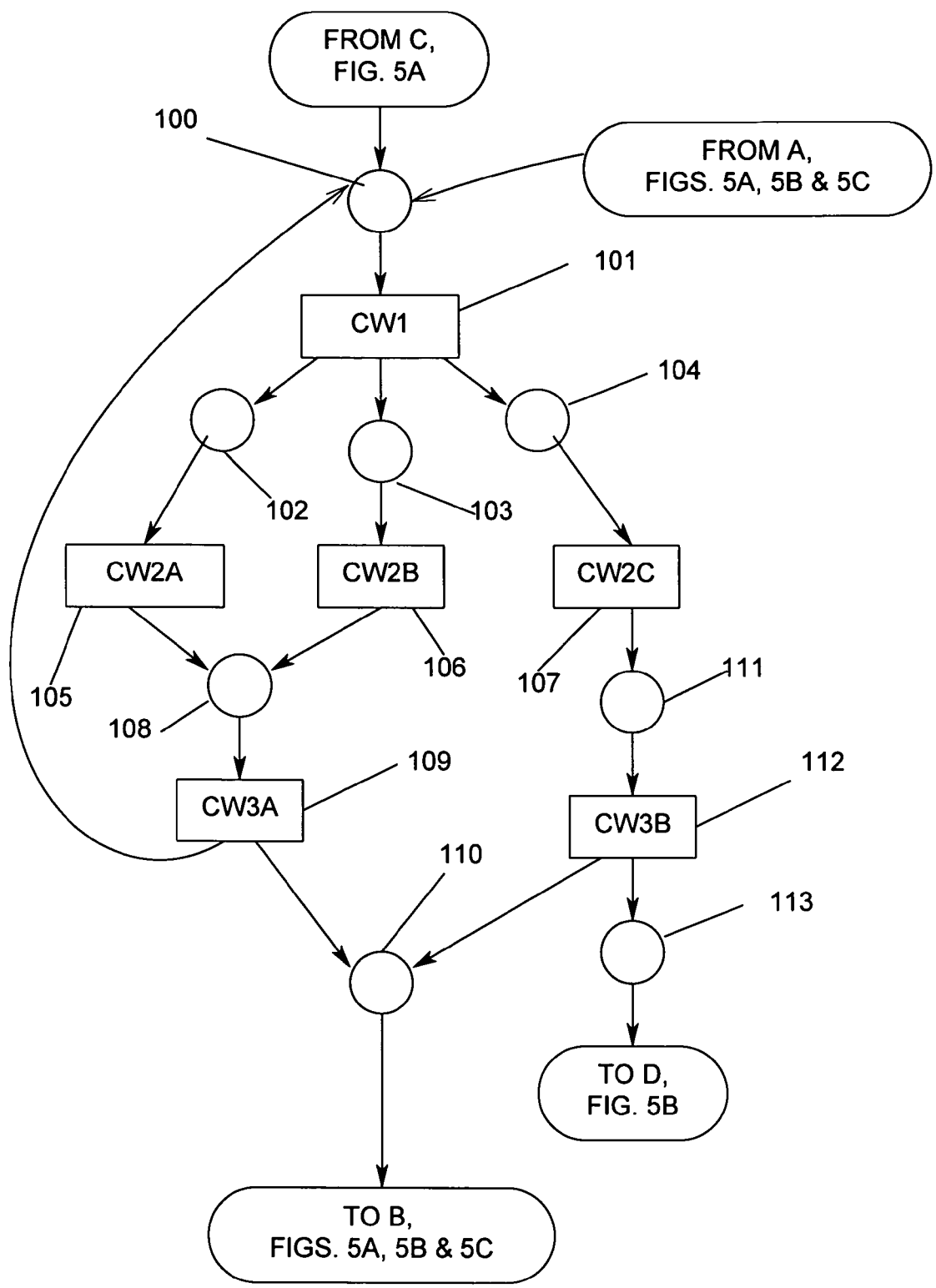

Referring now to FIG. 5D, a Petri net diagram of the Control Worker operation of the process is illustrated. The purpose of this operation is to provide synchronization between the parent and client threads. This operation provides the primary control routine for the client thread; and, it is basically a simple loop. At the top of the loop it waits for a place 100 to be marked. When the place 100 is marked an indication is made that there is a task for the child thread to perform. At the bottom of the loop the transition 109 marks the place 110 which signals the parentEvent (as denoted by the connector B) indicating that the child thread has completed the task. The body of this loop determines which operation is being requested and invokes the appropriate operation.

The functionality of the control worker operation is further defined herein below. Beginning with the place 100 entry is made into a loop that performs the following steps:

CW1. Wait for the childEvent object to be signaled. The childEvent is pointed to by a member variable of the TLS container (pointed to by oidGenCont) (transition 101).

CW2. Retrieve the "operation" member from the TLS container; and, based on its value, execute one of the steps listed below as CW2A, CW2B or CW2C.

CW2A. If the operation member is "initialize", call the initialize operation that is described herein below and depicted in FIG. 6 (transition 105).

CW2B. If the operation member is "generateOid", call the "generateoid" operation that is described herein below and depicted in FIG. 8A and FIG. 8B (transition 106).

CW2C. If the operation member is "terminate", call the terminate operation that is described herein below and depicted in FIG. 7 (transition 107).

CW3A. Following the execution of either the transition 105 or the transition 106, a place 108 is marked which allows a transition 109 to be executed. The transition 109 marks the place 110, thus signaling to the parent thread that the child thread has completed its requested operation. Finally, transition 109 jumps back to the beginning of the loop where it again waits for the place 100 to be marked.

CW3B. Alternatively, following the execution of the transition 107, a place 111 is marked which allows a transition 112 to be executed. The transition 112 also marks the place 110, thus signaling to the parent thread that the child thread has completed its requested operation. Finally, transition 112 marks a place 113 which allows the transition 78 of FIG. 5B to execute and thus terminate the child thread.

Figure 6:
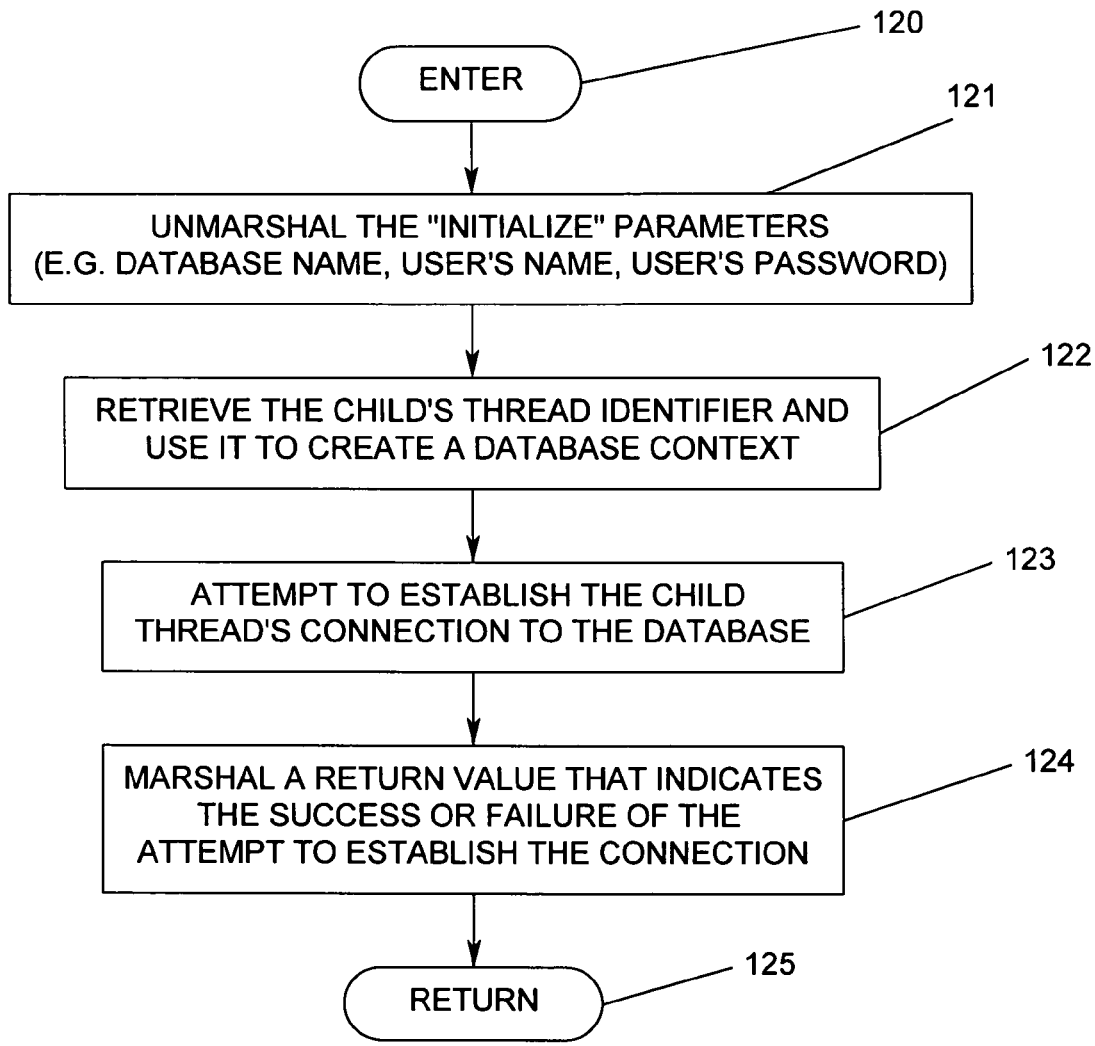
FIG. 6 is a flow chart of the initialize operation.

Referring now to FIG. 6, a flow chart is illustrated of the Initialize Operation of the process, which is called by the transition 105 within the Control Worker operation (FIG. 5D). The Initialize Operation opens the client thread's connection to the relational database. The process begins with an enter bubble 120 followed by a step of un-marshalling the "initialize" parameters (e.g. database name, user's name, user's password—block 121). Next, the child thread invokes the thread package's function that retrieves the identifier of the child thread. This thread identifier value is used to create a database context (block 122) for the relational database. After this, an attempt is made to establish the child thread's connection to the relational database (block 123) using the API 24 of the RDBMS 23. Finally, a step of marshalling a return value that indicates the success or failure of the attempt to establish the connection is made (block 124) and the process returns (bubble 125).

Figure 7:
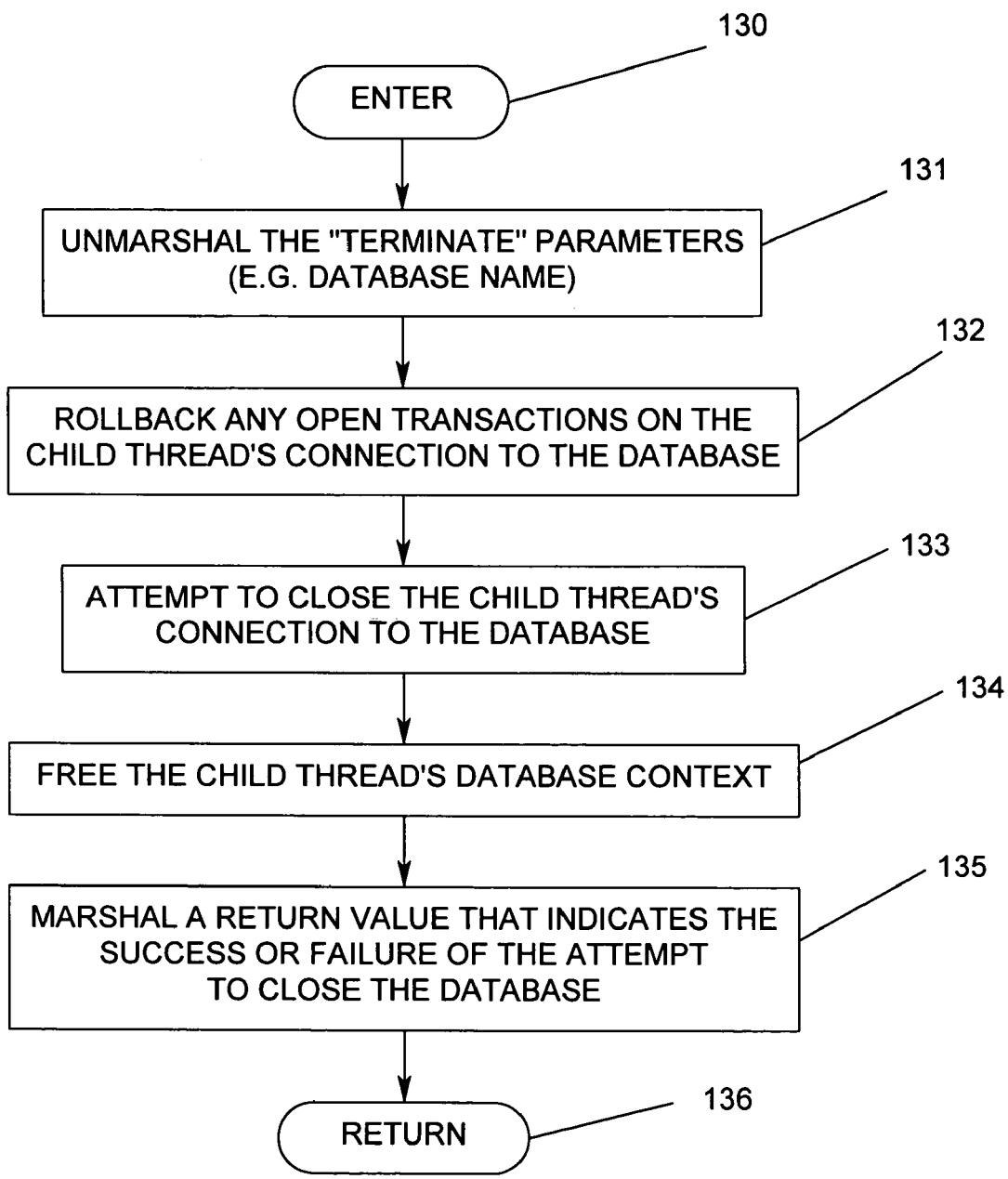
FIG. 7, is a flow chart of the terminate operation.

Referring now to FIG. 7, a flow chart of the Terminate Operation of the process is shown. This operation, which is called by the transition 107 (FIG. 5D) closes the client thread's connection to the relational database using the API 24. The process begins with an enter bubble 130 followed by a step of un-marshalling the "terminate" parameters (e.g. database name) (block 131). Next, a rollback is made of any open transactions on the child thread's connection to the relational database (block 132) using the API 24. After this, an attempt is made to close the child thread's connection to the relational database (block 133) using the API 24. A step of freeing the child thread's database context is made (block 134). Finally, a step of marshalling a return value that indicates the success or failure of the attempt to close the relational database is made (block 135) and the process returns (bubble 136).

Figure 8A:
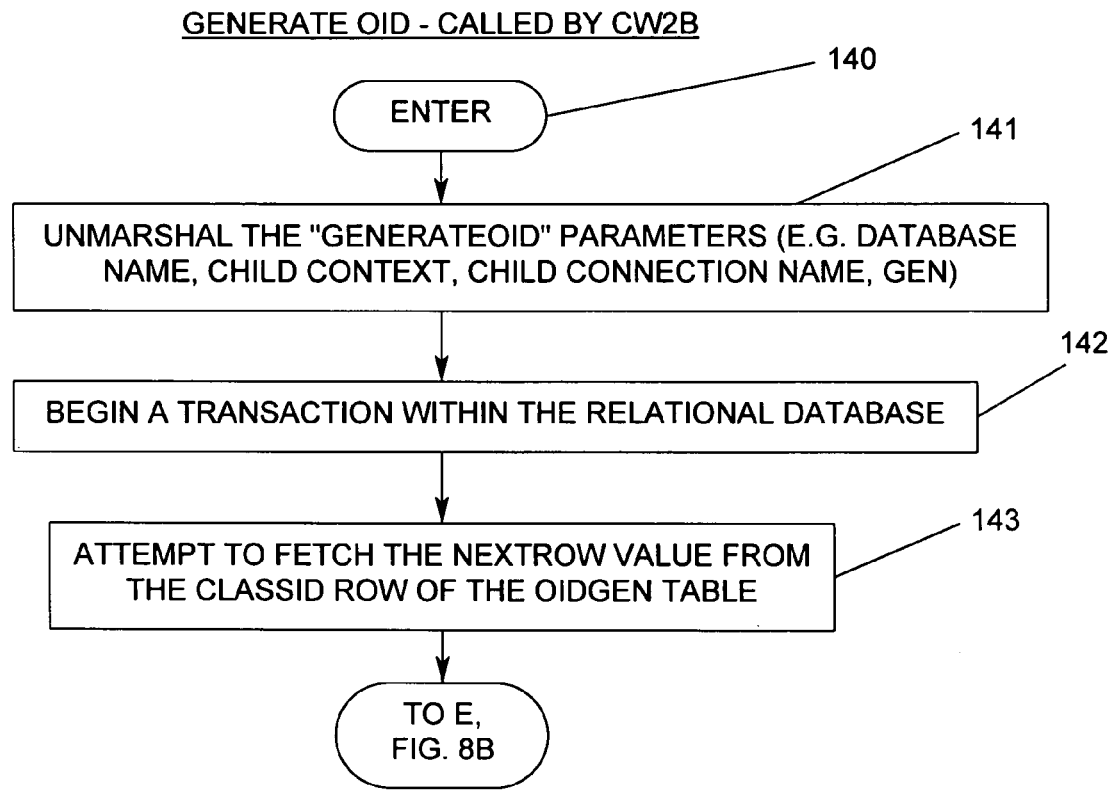
FIGS. 8A and 8B, combined illustrate a flow chart of the generate Object Identifier ("OID") operation.
Figure 8B:
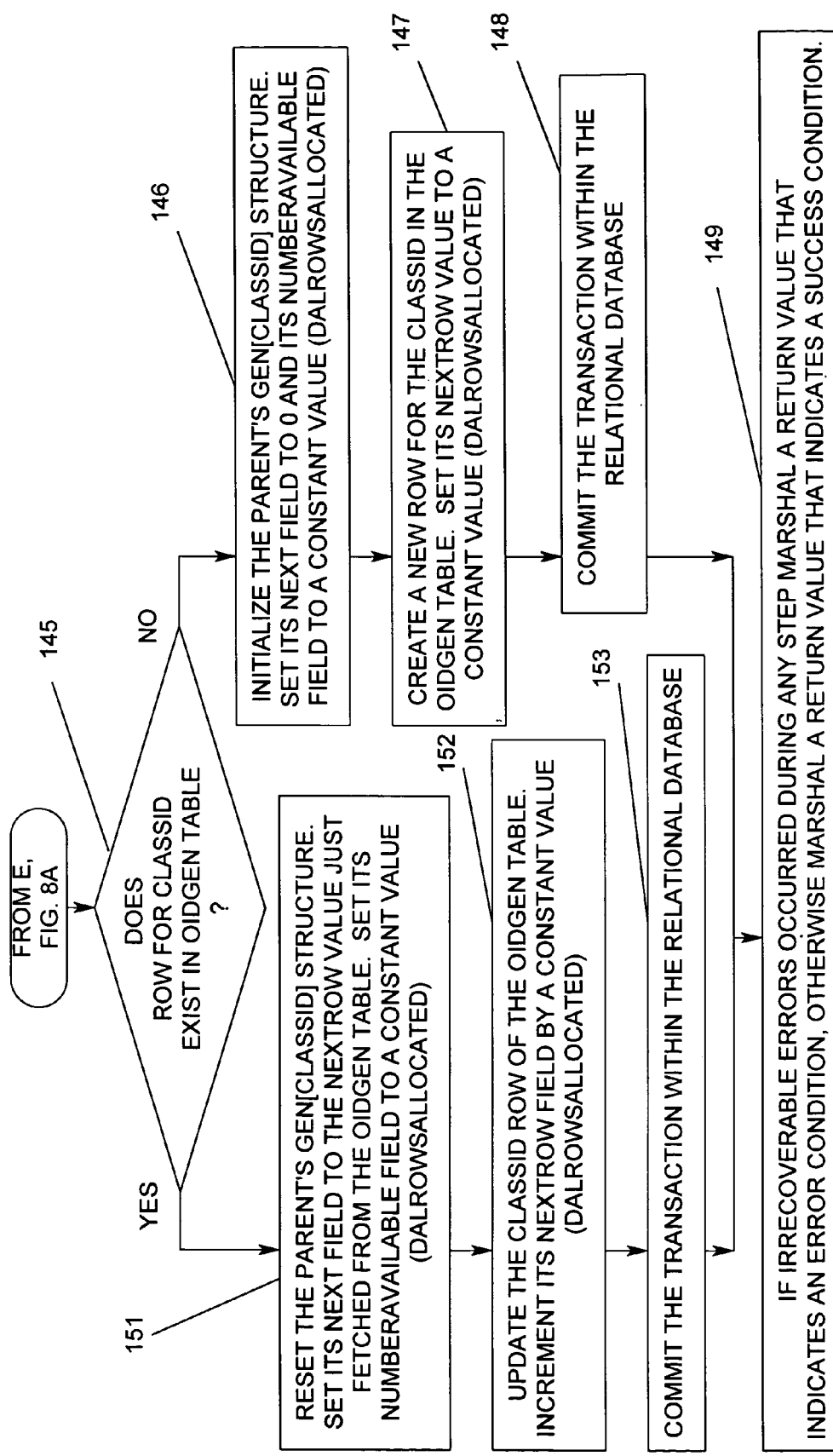

Referring now to FIGS. 8A and 8B, a flow chart of the generate Object Identifier ("OID") is shown. The client thread uses this operation to pre-allocate the right for the parent thread to use a set of sequentially ordered Object Identifiers of a constant size (DALROWSALLOCATED). This operation is called by the transition 106 (FIG. 5D). The operation begins with an enter bubble 140 followed by a step of un-marshalling the "generateOID" parameters (e.g. database name, child context, child connection name, gen) (block 141). Next, a transaction is begun within the relational database using the API 24 (block 142). An attempt is next made to fetch the nextRow value from the classId row of the OIDGEN table (block 143). The purpose for the step at the block 143 is to retrieve the largest unallocated object number. The process illustration continues in FIG. 8A as denoted by a connector C.

Referring now to FIG. 8B at the connector C, an inquiry is made as to whether or not the row for classId exist in the OIDGEN table (diamond 145). The OIDGEN table contains a row for each class of object stored in the object-oriented database. Each of these rows contain a number field that stores the smallest unassigned object number for each class. As new objects of a given class are created in the object-oriented database the number field of the corresponding (classID) row of the OIDGEN table takes on increasing values. If the OIDGEN table does not contain a row for classID, then the current invocation of generate OID (FIGS. 8A and 8B) is a part of the very first creation of an object of the class so the parent's gen[classId] structure is initialized; and, its next field is set to zero and its numberAvailable field to a constant value (DALROWSALLOCATED) (block 146). This marshals the return values, which assigns all object numbers between zero and the constant value DALROWSALLOCATED for future use. After this, a new row is created for the classId in the OIDGEN table; and, its nextRow value is set to a constant value (DALROWSALLOCATED) (block 147). Following this, a commit is made to the transaction within the relational database (block 148). Thus, recording the allocations of object numbers on disk. If un-recoverable errors occurred during any step, a return value is marshaled, which indicates an error condition; otherwise, a return value is marshaled, which indicates a success condition (block 149) and a return is made to the user (bubble (150).

If there is a row for classId in the OIDGEN table, that is if the answer to the inquiry in the diamond 145 is yes, then the parent's gen[classId] structure is reset; its next field is set to the nextRow value just fetched from the OIDGEN table; and, its numberAvailable field is set to a constant value (DALROWSALLOCATED) (block 151). Next, the classId row of the OIDGEN table is updated; and, its nextRow field is incremented by a constant value (DALROWSALLOCATED) (block 152). After this, a commit is made to the transaction within the relational database (block 153). The step depicted by the block 149 is repeated: If irrecoverable errors occurred during any step marshal a return value that indicates an error condition, otherwise marshal a return value that indicates a success condition.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a client application and first and second DBMS software, said system having a storage medium accessible by said second DBMS software and said first DBMS software being accessible by said client application, a method for generating unique object identifiers in a data abstraction layer disposed between said first and said second DBMS software in response to a parent thread performing said client application, said method comprising the steps of:
   a. creating a child thread that has access to said second DBMS software, said child thread being used exclusively for generating object identifier numbers and for returning the same to said parent thread;
   b. creating a unique object identifier table, which is maintained by said child thread;
   c. in response to a request by said parent thread for a unique object identifier, said child thread generating n ones of said unique object identifiers and communicating values of said unique object identifiers to said parent thread; and,
   d. recording in said table the fact that n unique object identifiers have been generated.

2. The method as in claim 1 wherein said first DBMS software is an object-oriented database management system.

3. The method as in claim 1 wherein said second DBMS software is a relational database management system.

4. The method as in claim 1 further comprising the steps of:
   e. beginning a transaction in said second DBMS software;
   f. computing the next-row object identifier from information stored in said table; and,
   g. communicating the result of said computing step to said parent thread.

5. The method as in claim 4 further comprising the steps of:
   h. updating the row in said table associated with the class of the object being created and incrementing its next row by a constant value; and,
   i. committing said transaction within said second DBMS software.

6. The method as in claim 1 further comprising the steps of:
   e. beginning a transaction in said second DBMS software;
   f. computing the next-row object identifier from a constant value; and,
   g. communicating result of said computing step to said parent thread.

7. The method as in claim 6 further comprising the steps of:
   h. creating a new row in said table associated with the class of the object being generated and initializing its next row to a constant value; and,
   i. committing said transaction within said second DBMS software.

8. In a computer system executing a client application software, an object-oriented DBMS software and a relational DBMS software, said system having a storage medium accessible by said relational DBMS software and said object-oriented DBMS software being accessible by said client application software, a method for generating unique object identifiers in a data abstraction layer disposed between said object-oriented DBMS software and said relational DBMS software in response to a parent thread performing said client application software, said method comprising the steps of:
   a. creating a child thread that has access to said relational DBMS software, said child thread being used exclusively for generating object identifier numbers and for returning the same to said parent thread;
   b. creating a unique object identifier table, which is maintained by said child thread;
   c. in response to a request by said parent thread for a unique object identifier, said child thread generating a finite number of said unique object identifiers; and,
   d. recording in said table the fact that said finite number of unique object identifiers have been generated.

9. The method as in claim 8 further comprising the steps of:
   e. beginning a transaction in said second DBMS software;
   f. computing the next-row object identifier from information stored in said table;
   g. communicating the result of said computing step to said parent thread;
   h. updating the row in said table associated with the class of the object being created and incrementing its next row by a constant value; and,
   i. committing said transaction within said second DBMS software.

10. The method as in claim 8 further comprising the steps of:
   e. beginning a transaction in said second DBMS software;
   f. computing the next-row object identifier from a constant value;
   g. communicating result of said computing step to said parent thread;
   h. creating a new row in said table associated with the class of the object being generated and initializing its next row to a constant value; and,
   i. committing said transaction within said second DBMS software.

11. A storage medium encoded with machine-readable computer program code for use in a computer system executing a client application and first and second DBMS software, said system having a storage device accessible by said second DBMS software and said first DBMS software being accessible by said client application, said computer program code including a method for generating unique object identifiers in a data abstraction layer, wherein, when the computer program code is executed by a computer, the computer performs the steps of:
   a. creating a child thread that has access to said second DBMS software, said child thread being used exclusively for generating object identifier numbers and for returning the same to said parent thread;

b. creating a unique object identifier table, which is maintained by said child thread;

c. in response to a request by said parent thread for a unique object identifier, said child thread generating n ones of said unique object identifiers; and, d. recording in said table the fact that n unique object identifiers have been generated.

12. The medium as in claim 11 wherein said first DBMS software is an object-oriented database management system.

13. The medium as in claim 11 wherein said second DBMS software is a relational database management system.

14. The medium as in claim 11 further comprising the steps of:

e. beginning a transaction in said second DBMS software;

f. computing the next-row object identifier from information stored in said table; and, g. communicating the result of said computing step to said parent thread.

15. The medium as in claim 14 further comprising the steps of:

h. updating the row in said table associated with the class of the object being created and incrementing its next row by a constant value; and, i. committing said transaction within said second DBMS software.

16. The medium as in claim 11 further comprising the steps of:

e. beginning a transaction in said second DBMS software;

f. computing the next-row object identifier from a constant value; and, g. communicating result of said computing step to said parent thread.

17. The medium as in claim 16 further comprising the steps of:

h. creating a new row in said table associated with the class of the object being generated and initializing its next row to a constant value; and, i. committing said transaction within said second DBMS software.

* * * * *